(12) United States Patent
Super

(10) Patent No.: US 9,927,121 B2
(45) Date of Patent: Mar. 27, 2018

(54) SERVO GAS SYSTEM, GAS BURNER AND METHOD FOR OPERATING THE GAS BURNER

(71) Applicant: Honeywell Technologies Sarl, Rolle (CH)

(72) Inventor: Willem Super, Emmen (CH)

(73) Assignee: Honeywell Technologies, Sarl, Rolle (CH)

( * ) Notice: Subject to any disclaimer, the term of this patent is extended or adjusted under 35 U.S.C. 154(b) by 905 days.

(21) Appl. No.: 14/446,075

(22) Filed: Jul. 29, 2014

(65) Prior Publication Data

US 2015/0030986 A1 Jan. 29, 2015

(30) Foreign Application Priority Data

Jul. 29, 2013 (EP) ..................... 13178379

(51) Int. Cl.
*F16K 31/02* (2006.01)
*G05D 16/20* (2006.01)
(Continued)

(52) U.S. Cl.
CPC ............. *F23N 1/022* (2013.01); *F23N 1/002* (2013.01); *F23N 1/005* (2013.01); *F23N 1/007* (2013.01);
(Continued)

(58) Field of Classification Search
CPC .......... F23N 1/022; F23N 1/007; F23N 1/025; F23N 1/002; F23N 1/027; F23N 1/005;
(Continued)

(56) References Cited

U.S. PATENT DOCUMENTS

| 3,977,423 A | * | 8/1976 | Clayton | ............... G05D 16/166 137/12 |
| 4,492,560 A | * | 1/1985 | Sundberg | ................ F23N 5/003 236/15 E |

(Continued)

FOREIGN PATENT DOCUMENTS

WO 20060075864 7/2006

OTHER PUBLICATIONS

Svete A, et al., "Static and Dynamic Characteristics of a Hydraulic Wheatstone Bridge Mass Flowmeter," Flow Measurement and Instrumentation, Oxford, GB, vol. 20, No. 6, Dec. 1, 2009.

(Continued)

*Primary Examiner* — Minh Le
(74) *Attorney, Agent, or Firm* — Seager, Tufte & Wickhem, LLP

(57) ABSTRACT

Servo gas system (11) for a gas burner (10), namely for controlling a pressure regulation valve (20) positioned in a gas duct (18) of the gas burner, thereby controlling a gas pressure within the gas duct (18) being present downstream of the pressure regulation valve (20) and thereby controlling a pressure difference between a pressure in a burner chamber (12) of the gas burner and said gas pressure within the gas duct (18), the servo gas system (11) comprising a static servo gas flow branch (28) and a dynamic servo gas flow branch (29) being connected in parallel, and a flow sensing element (30) being connected between the static servo gas flow branch (28) and the dynamic servo gas flow branch (29) and providing a signal used to control the pressure regulation valve (20) by an electric actuator (41).

20 Claims, 2 Drawing Sheets

Figure 1:
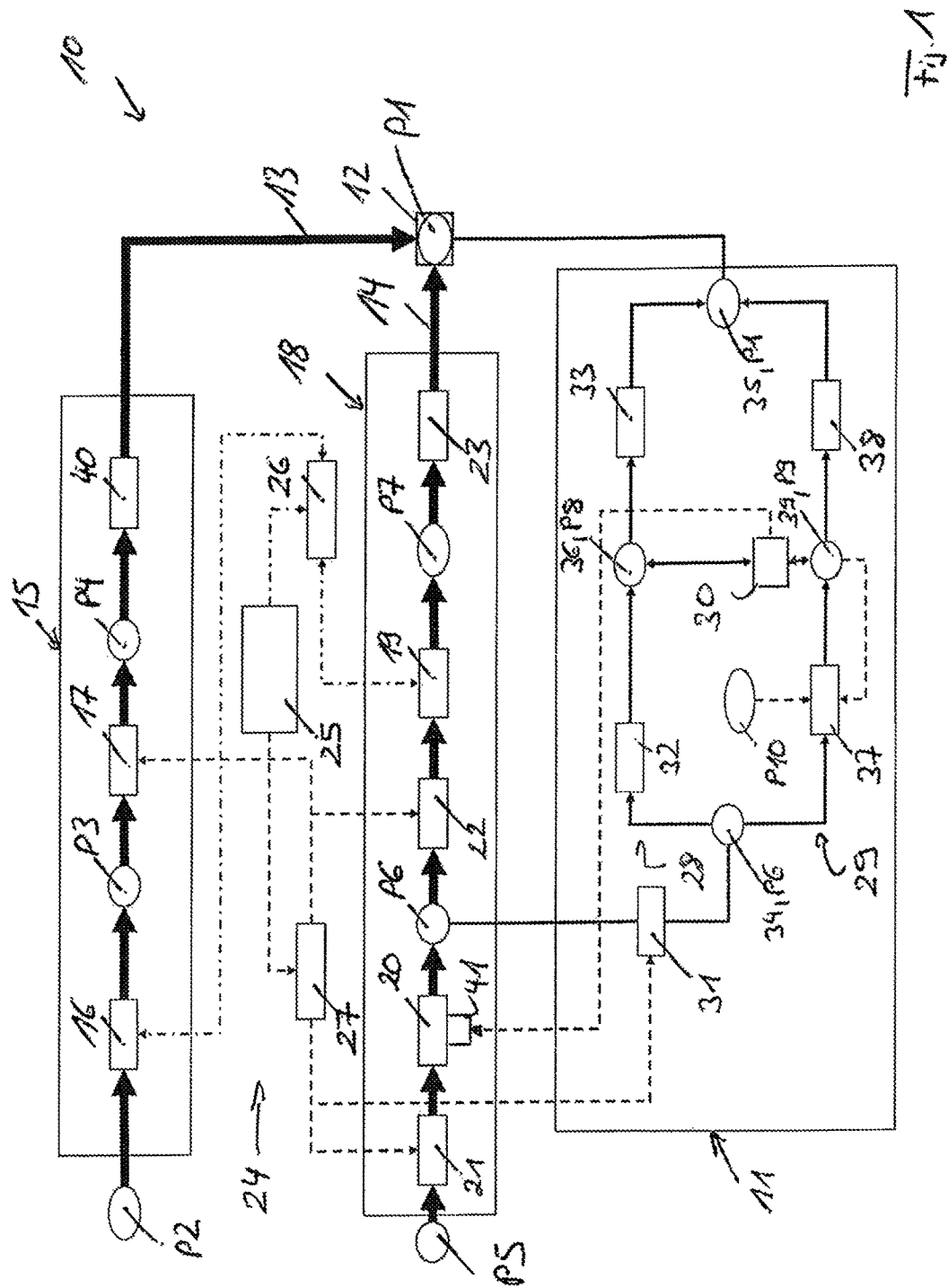

(51) Int. Cl.
*F23N 1/02* (2006.01)
*F23N 1/00* (2006.01)
*F23N 5/18* (2006.01)

(52) U.S. Cl.
CPC .............. *F23N 1/025* (2013.01); *F23N 1/027* (2013.01); *G05D 16/202* (2013.01); *F23K 2900/05002* (2013.01); *F23N 2005/185* (2013.01); *F23N 2025/04* (2013.01); *F23N 2025/06* (2013.01); *F23N 2035/16* (2013.01); *F23N 2039/04* (2013.01)

(58) Field of Classification Search
CPC ........... F23N 2005/185; F23N 2035/16; F23N 2025/06; F23N 2025/04; F23N 2039/04; G05D 16/202; F23K 2900/05002
USPC .............. 137/487.5, 12, 488; 431/12, 19, 14
See application file for complete search history.

(56) References Cited

U.S. PATENT DOCUMENTS

| | | | | |
|---|---|---|---|---|
| 4,527,583 | A | * | 7/1985 | Simpson ............... G01L 1/2281 137/487.5 |
| 2008/0000530 | A1 | * | 1/2008 | Sun .................. C23C 16/45557 137/487.5 |
| 2009/0197212 | A1 | * | 8/2009 | Masen .................... F23N 1/022 431/12 |
| 2010/0059694 | A1 | * | 3/2010 | Olander .................... F17C 5/00 250/492.3 |

OTHER PUBLICATIONS

R.S. Whipple, "A Hydraulic Analogy of the Wheatstone Bridge," Proc. Phys. Soc., London, vol. 28, No. 1, Dec. 1, 1915.
Search Report for Corresponding Application No. EP 13178379.7-1602, dated Nov. 28, 2013.

* cited by examiner

SERVO GAS SYSTEM, GAS BURNER AND METHOD FOR OPERATING THE GAS BURNER

The present application claims priority to European Patent Application No. EP 13 178 379.7, filed on Jul. 29, 2013, entitled "SERVO GAS SYSTEM, GAS BURNER AND METHOD FOR OPERATING THE GAS BURNER", which is incorporated herein by reference.

The present patent application relates to a servo gas system for a gas burner, to a gas burner having such a servo gas system and to a method for operating such a gas burner.

A gas burner comprises a burner chamber for combusting a gas/air mixture. A gas burner further comprises an air duct providing an air flow to the burner chamber and a gas duct providing a gas flow to the burner chamber. A gas burner further comprises a fan and preferably an air valve positioned within the air duct. A gas burner further comprises a gas valve and a pressure regulating valve positioned within the gas duct. A controller of the gas burner controls the gas/air mixture provided to the burner chamber by adjusting the air valve and the gas valve or by adjusting the fan and the gas valve. According to a first alternative, the controller adjusts at a defined speed of the fan the position of the air valve and the position of the gas valve on basis of a valve position relationship stored in the controller. According to a second alternative, e.g. when no air valve is present in the air duct, the controller adjusts at the speed of the fan and the position of the gas valve on basis of a fan speed—gas valve position relationship stored in the controller. The valve position relationship or the fan speed—gas valve position relationship stored in the controller is valid for a constant pressure difference between the pressure in the burner chamber and a gas pressure in the gas duct upstream of the gas valve. The pressure regulation valve positioned in the gas duct controls this gas pressure upstream of the gas valve in order to keep the pressure difference constant. For the time being, the pressure regulation valve is controlled fully pneumatically to keep the pressure difference constant. However, with such a fully pneumatically controlled pressure regulation valve, it is not always feasible to provide a simple, reliable and failsafe control of the pressure difference.

Against this background, a servo gas system for a gas burner, a gas burner having such a servo gas system and to a method for operating such a gas burner are provided.

The present application provides a servo gas system for a gas burner, namely for controlling a pressure regulation valve positioned in a gas duct, thereby controlling a gas pressure within the gas duct being present downstream of the pressure regulation valve and thereby controlling a pressure difference between a pressure in a burner chamber of the gas burner and said gas pressure within the gas duct, wherein the servo gas system comprising: a static servo gas flow branch and a dynamic servo gas flow branch being connected in parallel, and a flow sensing element being connected between the static servo gas flow branch and the dynamic servo gas flow branch and providing a signal used to control the pressure regulation valve by an electric actuator.

The servo gas system provides a simple, reliable and failsafe control of the gas pressure within the gas duct and thereby of the pressure difference between the pressure in the burner chamber of the gas burner and said gas pressure within the gas duct.

The present application avoids problems associated with a fully pneumatically controlled pressure regulation valve. With the use of the claimed servo gas system, it is possible to avoid oscillation effects being present when a fully pneumatically controlled pressure regulation valve is used. Further on, the pressure regulation valve controlled by the claimed servo gas system can be operated in a boarder range than a fully pneumatically controlled pressure regulation valve. When using the claimed servo gas system, it is not necessary that an installer changes springs in the field before the correct setting for the pressure regulation valve can be found. As a result, a source of many errors can be eliminated.

The static servo gas flow branch may comprise a first flow restricting device and downstream of the first flow restricting device a second flow restricting device, thereby providing a first pressure zone upstream of the first flow restricting device in which the gas pressure to be controlled is present, a second pressure zone downstream of the second flow restricting device in which the pressure of the pressure of the burner chamber is present, and an intermediate pressure zone.

The dynamic gas flow branch may comprise a pressure regulator and downstream of the pressure regulator a third flow restricting device, thereby providing a first pressure zone upstream of the pressure regulator in which the gas pressure to be controlled is present, a second pressure zone downstream of the third flow restricting device in which the pressure of the burner chamber is present, and another intermediate pressure zone.

The first pressure zone of the static servo gas flow branch is connected to the first pressure zone of the dynamic servo gas flow branch. The second pressure zone of the static servo gas flow branch is connected to the second pressure zone of the dynamic servo gas flow branch.

The flow sensing element is connected between the intermediate pressure zone of the static servo gas flow branch and the intermediate pressure zone of the dynamic servo gas flow branch. This design is simple and reliable.

Preferably, the first flow restricting device and the second flow restricting device of the static servo gas flow branch are both fixed flow restricting devices. This alternative would be very simple and reliable. Alternatively, one of said flow restricting devices is fixed and the other of said flow restricting devices is adjustable. With this alternative, it is possible to adjust the pressure ratio between the pressures in the three pressure zones of the static servo gas flow branch. The third flow restricting device may be a fixed or an adjustable flow restricting device.

Figure 2:
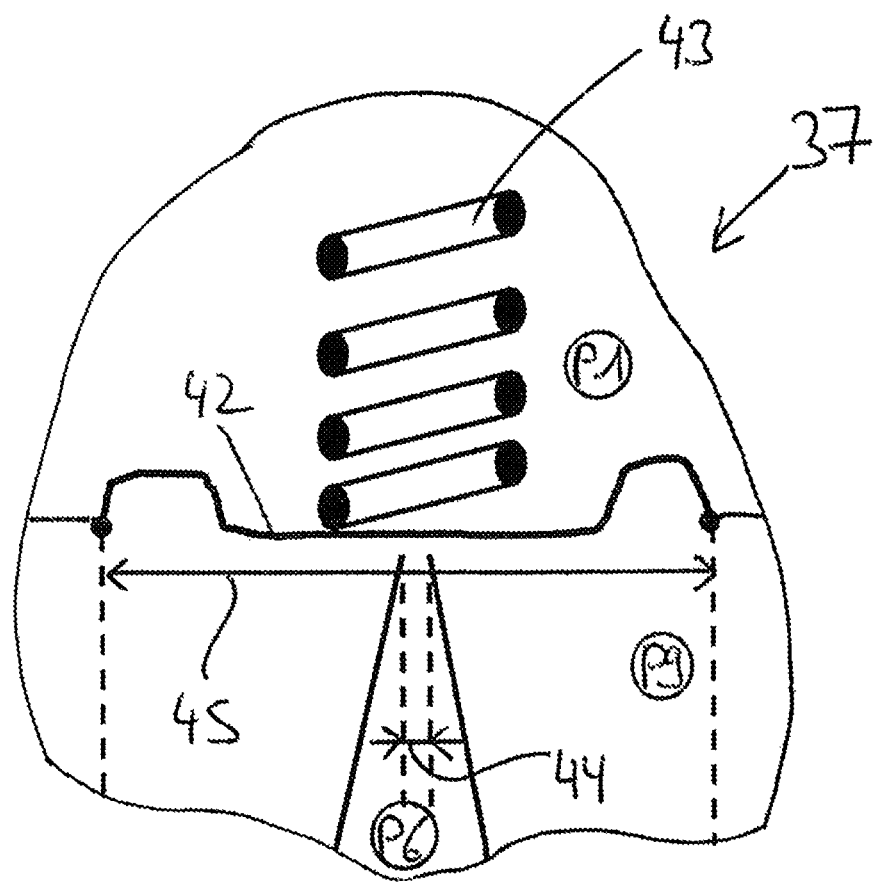

Exemplary embodiments are explained in more detail on the basis of the drawing, in which:

FIG. 1 shows a schematic view of a gas burner according to the present application having a servo gas system according to the present application; and FIG. 2 shows a schematic drawing of the pressure regulator of the servo gas system.

Turning specifically to FIG. 1, which shows a schematic block diagram of a gas burner 10 according to the present application having a servo gas system 11 according to the present application.

The illustrative gas burner 10 comprises a burner chamber 12 for combusting a gas/air mixture. The gas/air mixture provided to the burner chamber 12 has a defined mixing ratio of gas and air and is provided by mixing an air flow 13 with a gas flow 14. A pressure P1 is present in the burner chamber 12. The burner chamber 12 is also often called the combustion chamber.

The air flow 13 is provided by an air duct 15. An air valve 16 and a fan 17 are often both positioned within the air duct 15 of the gas burner 10. The air flow 13 depends on the position of the air valve 16 and/or on the speed of the fan 17. Preferably, the air valve 16 is provided by a so-called butterfly valve, wherein in the shown embodiment of FIG. 1, the fan 17 is positioned downstream of the air valve 16. However, it is also possible that the fan 17 is positioned upstream of the air valve 16. It is also possible to regulate the air flow without the air valve 16, namely by varying the speed of the fan 17.

In the shown embodiment, upstream of the air valve 16, the air duct is connected to the ambient so that ambient pressure P2 is present upstream of the air valve 16. Downstream of the air valve 16 and upstream of the fan 17 a pressure P3 is present. Downstream of the fan 17, a pressure P4 is present. A baffle plate 40 may be positioned between the fan 17 and the burner chamber 12, providing a further flow restriction for the air flow 13.

The gas flow 14 is provided by a gas duct 18. A gas valve 19 and a pressure regulation valve 20 may be both positioned within a gas duct 18 of the gas burner 10. The gas flow 14 depends on the position of the gas valve 19. The gas valve 19 is also often called a fuel valve. The gas valve 19 is shown positioned downstream of the pressure regulation valve 20.

In the shown embodiment, two safety valves 21, 22 are positioned within the gas duct 18. A first safety shut-off valve 21 is connected between a gas supply and the pressure regulation valve 20, whereby a gas supply pressure P5 is present upstream of the first safety shut-off valve 21.

A second safety shut-off valve 22 is connected between the pressure regulation valve 20 and the gas valve 19, whereby a pressure P6 is present downstream of the pressure regulation valve 20, and whereby a pressure P7 is present downstream of the gas valve 19. A burner orifice 23 is positioned between the gas valve 19 and the burner chamber 12 providing a further flow restriction of the gas flow 14.

It is also possible to position the pressure regulator valve 20 downstream of second safety shutoff valve 22 and upstream of gas valve 19. In that case, the pressure downstream of pressure regulation valve 20 and upstream of gas valve 19 will be regulated by the pressure regulator valve 20.

The defined mixing ratio of the gas/air mixture is controlled by a controller 24.

In the shown embodiment, the controller 24 controls the mixing ratio of the gas/air mixture in such a way that a regulating unit 26 of the controller 24 adjusts for a defined speed of the fan 17, which is usually running at maximum fan speed, the position of the air valve 16 and the position of the gas valve 19 on basis of a valve position relationship stored in a burner management unit 25 of the controller 24. An activation/deactivation unit 27 of the controller 24 is adapted to switch on/off the safety valves 21, 22 and the fan 17.

The valve position relationship between the valve position of the air valve 16 and the valve position of the gas valve 19 which is stored in the burner management unit 25 of the controller 24 and which is used to control the defined mixing ratio of the gas/air mixture is only valid if the gas pressure P6 or the pressure difference between the burner chamber pressure P1 and the gas pressure P6 is at a constant level. The pressure regulation valve 20 is used to keep the gas pressure P6 and thereby the pressure difference between the burner chamber pressure P1 and the gas pressure P6 is at a constant level.

As mentioned above, it is also possible to regulate the air flow without the air valve 16, namely by varying the speed of the fan 17. In this case, the controller 24 controls the mixing ratio of the gas/air mixture in such a way that a regulating unit 26 of the controller 24 adjusts the speed of the fan 17 and the position of the gas valve 19 on basis of a fan speed—gas valve position relationship stored in a burner management unit 25 of the controller 24.

According to the present invention, the servo gas system 11 is used for controlling the pressure regulation valve 20 positioned in a gas duct 18 of the gas burner 10, thereby controlling the gas pressure P6 within the gas duct 18 being present downstream of the pressure regulation valve 20 and thereby controlling the pressure difference between the burner chamber pressure P1 and said gas pressure P6.

The servo gas system 11 may comprise a static servo gas flow branch 28 and a dynamic servo gas flow branch 29 being connected in parallel.

The servo gas system 11 further comprises a flow sensing element 30 being connected between the static servo gas flow branch 28 and the dynamic servo gas flow branch 29. The flow sensing element 30 provides a signal used to control the pressure regulation valve 20 by an electric actuator 41 of the pressure regulation valve 20. The electric actuator 41 is preferably provided by a stepper motor.

The servo gas system 11 uses a servo gas flow that is branched off from the main gas flow of the gas duct 16 downstream of the pressure regulation valve 20 and which is fed to the combustion chamber 12.

In the shown embodiment, a third safety shut-off valve 31 operated through activation/deactivation unit 27 of the controller 24 can be used to shut off the servo gas flow thorough servo gas system 11. In case that the pressure regulation valve 20 is positioned downstream of second safety shutoff valve 22, there is no need for such a third safety shut-off valve 31 in the servo gas system 11.

The static servo gas flow branch 28 is preferably provided by a tube comprising a first flow restricting device 32 and downstream of the first flow restricting device 32 a second flow restricting device 33 thereby providing three pressure zones 34, 35, 36. A first pressure zone 34 of the static servo gas flow branch 28 is provided upstream of the first flow restricting device 32, wherein the gas pressure P6 to be controlled by the pressure regulating valve 20 is present in the first pressure zone 34. A second pressure zone 35 of the static servo gas flow branch 28 is provided downstream of the second flow restricting device 33, wherein the pressure P1 of the burner chamber 12 is present in the second pressure zone 35. An intermediate pressure zone 36 of the static servo gas flow branch 28 is provided between the two flow restricting devices 32, 33, wherein an intermediate pressure P8 is present in said intermediate pressure zone 36.

In the shown embodiment, the first flow restricting device 32 and the second flow restricting device 33 of the static servo gas flow branch 29 are both shown as fixed flow restricting devices, preferably fixed orifices. This alternative is very simple and reliable.

Alternatively, the first flow restricting device 32 or the second flow restricting device 33 of the static servo gas flow branch 28 may be an adjustable flow restricting device while the other flow restricting device of the static servo gas flow branch 28 may be a fixed flow restricting device. In this alternative, it is preferred that the second flow restricting device 33 is an adjustable flow restricting device, preferably an adjustable orifice, while the first flow restricting device 32 is a fixed flow restricting device, preferably a fixed orifice. With this alternative, it is possible to adjust the pressure ratio between the pressures in the three pressure zones of the static servo gas flow branch.

The dynamic gas flow branch 29 is preferably provided by a tube comprising a pressure regulator 37 and downstream of the pressure regulator 37 a third flow restricting device 38 thereby providing three pressure zones 34, 35, 39. A first pressure zone 34 of the dynamic gas flow branch 29 is provided upstream of the pressure regulator 37, wherein the first pressure zone 34 of the dynamic gas flow branch 29 is connected to the first pressure zone 34 of the static servo gas flow branch 28 so that the same pressure P6 is present within the same. A second pressure zone 35 of the dynamic gas flow branch 29 is provided downstream of the third flow restricting device 33, wherein the second pressure zone 35 of the dynamic gas flow branch 29 is connected to the second pressure zone 35 of the static servo gas flow branch 28 so that the same pressure P1 is present within the same. An intermediate pressure zone 39 of the dynamic servo gas flow branch 29 is provided between the pressure regulator 37 and the third flow restricting device 38, wherein an intermediate pressure P9 is present in said intermediate pressure zone 39. The relation between the pressures P6, P9 and P1 is variable and depends on the pressure regulator 37.

The third flow restricting device 38 may be a fixed flow restricting device, preferably a fixed orifice. Alternatively, the third flow restricting device 38 may be an adjustable flow restricting device, preferably an adjustable orifice. This would allow fine tuning of the servo gas system 10.

The flow sensing element 30 is connected between the intermediate pressure zone 36 of the static servo gas flow branch 28 and the intermediate pressure zone 39 of the dynamic servo gas flow branch 29. The flow sensing element 30 is preferably positioned in a tube connecting the intermediate pressure zone 36 of the static servo gas flow branch 28 and the intermediate pressure zone 39 of the dynamic servo gas flow branch 29.

It is possible that another flow restricting device like an orifice (not shown) is connected in series to the flow sensing element 30 and thereby between the intermediate pressure zone 36 of the static servo gas flow branch 28 and the intermediate pressure zone 39 of the dynamic servo gas flow branch 29. Said flow restricting device, e.g. said orifice, can be positioned upstream or downstream of said flow sensing element 30. Said flow restricting device can be used to influence the sensing behaviour of the flow sensing element 30 e.g. by influencing damping characteristics of the flow sensing element 30 and/or influencing the sensing range of the flow sensing element 30.

The pressure regulator 37 of the dynamic servo gas flow branch 29, which is preferably a pneumatic pressure regulator, is connected to the pressures P6 and P9 and further to a reference pressure P10 present in reference pressure zone.

The reference pressure P10 can depend from the ambient pressure P2 or to the burner chamber pressure P1.

Preferably, the reference pressure P10 depends from the burner chamber pressure P1 by connecting the pressure regulator 37 and the burner chamber 10 through a pressure feedback duct (not shown). In this case, the reference pressure P10 equals the sum of the burner chamber pressure P1 and the pressure resulting from a force provided by spring of the pressure regulator 37 acting on a membrane of the same. FIG. 2 shows a schematic drawing of the pressure regulator 37 having a membrane 42 and a spring 43, whereby the pressure P1 and the force provided by the spring 43 act on one side of the membrane 42 and the pressures P9 and P6 act on the other side of the membrane 42. Considering that the membrane area 44 which is subject to the pressure P6 is relative small compared to the membrane area 45 which is subject to the pressure P9, the following equation is valid for the pressure P10=P1+force of spring 43/Size of membrane area 45. In some cases, the spring force of spring 43 can be adjusted by a screw (not shown) acting on the spring 43.

The servo gas system 11 is in equilibrium when the flow sensing element 30 senses zero flow. When the servo regulation system is in equilibrium, the relation between the pressures P6, P8 and P1 is a fixed value. In this case the pressures P8 and P9 are the same (P8=P9).

When the gas pressure P6 to be controlled by the pressure regulating valve 20 changes, the pressure P8 in the intermediate pressure zone 36 of static servo gas flow branch 28, the pressure P9 in the intermediate pressure zone 39 of static dynamic gas flow branch 29 and the position of the pressure regulator 37 are subject to changes.

As a result, the servo gas system 11 is out of equilibrium and the flow sensing element 30 senses a flow being different from zero. The flow sensing element 30 then provides a signal to adjust the pressure regulation valve 20 through the electric actuator 41, which adjusts the flow restriction in the gas duct 18 and hence the regulated pressure P6 in the gas duct 18.

When the servo gas system 11 is out of equilibrium under the condition that the pressure P9 is larger than the pressure P10 (P9>P10), the flow resistance of the pressure regulator 37 has decreased compared to the flow resistance of the same in equilibrium. If, for example, the pressure regulator 37 is fully opened, the flow resistance of the same is relatively low so that mainly the entire servo gas flow of the servo gas flow system 11 flows through the dynamic servo gas flow branch 29. It this case, P9 corresponds approximately to P6 (P9~P6), the pressure P8 is smaller than the pressure P6 (P8<P6), the pressure P8 is smaller than the pressure P9 (P8<P9) and the pressure P8 is larger than the pressure P10 (P8>P10), so that the flow sensing element detects a gas flow through the same and generates a signal to adjust the pressure regulating valve in the closing direction thereby decreasing the pressure P6. P9 will decrease relatively more than P8 thereby approaching equilibrium.

When the servo gas system 11 is out of equilibrium under the condition that the pressure P9 is smaller than the pressure P10 (P9<P10), the flow resistance of the pressure regulator 37 has increased compared to the flow resistance of the same in equilibrium. If, for example, the pressure regulator 37 is fully closed, the flow resistance of the same is relatively high so that mainly the entire servo gas flow of the servo gas flow system 11 flows through the static servo gas flow branch 28. It this case, the pressure P8 is smaller than the pressure P6 (P8<P6), the pressure P9 is smaller than the pressure P8 (P9<P8) and the pressure P8 is smaller than the pressure P10 (P8<P10), so that the flow sensor detects a gas flow through the same and generates a signal to adjust the pressure regulating valve in the opening direction thereby increasing the pressure P6. P8 will decrease relatively more than P9 thereby approaching equilibrium.

Any situation between fully closed pressure regulator 37 and fully opened pressure regulator 37 can occur.

In both scenarios in which the servo gas system 11 is out of equilibrium, the pressures P1 and P6 will not be significantly affected by the servo gas flow though one of the branches 28, 29 of the servo gas system 11. The servo gas flow through the branches 28, 29 is relatively small compared to main gas flow 14. So, upstream pressure P6 and downstream pressure P1 of the branches 28, 29 will not be significantly affected by the servo gas flow.

The pressure regulator 37 has a flow resistance depending mainly on the pressure P9 downstream of the same. The flow resistance of the pressure regulator 37 is dynamic while the flow resistances of the flow restricting devices being preferably orifices 32, 33, 38 are static.

It is possible that another flow restricting device like an orifice (not shown) may be positioned in series with the pressure regulator 37, either upstream of the pressure regulator 37 in the dynamic servo gas flow branch 29 or downstream of the pressure regulator 37 in the servo gas flow branch 29 but upstream from the tube in which the flow sensing element 30 is positioned. The flow restricting device, e.g. said orifice, can be used to influence the behavior of the pressure regulator 37, e.g. my making the regulation behavior of the same more or less aggressive.

The invention makes it possible to regulate a constant gas pressure P6 with the flow sensing element 30 and with the electric actuator 41 for the pressure regulation valve 20 in a reliable, simple and fail-safe way.

The invention decouples the control of the defined mixing ratio of the gas/air mixture from pressure surges feedback, due to ignition expansion, from the burner chamber 12 during burner start up. Start-up performance of the gas burner can be improved with the invention.

The flow sensing element 30 is used around zero flow where the same is accurate and reliable. The servo gas system 11 may include parts like tubes and orifices which are reliable. Check and calibration of the flow sensing element 30 is possible during operation to provide further reliability.

LIST OF REFERENCE SIGNS 10 gas burner
11 servo gas system
12 burner chamber
13 air flow
14 gas flow
15 air duct
16 air valve
17 fan
18 gas duct
19 gas valve
20 pressure regulating valve
21 safety valve
22 safety valve
23 burner orifice
24 controller
25 burner management unit
26 regulating unit
27 activation/deactivation unit
28 static servo gas flow branch
29 dynamic servo gas flow branch
30 flow sensing element
31 safety valve
32 flow restricting device
33 flow restricting device
34 pressure zone
35 pressure zone
36 pressure zone
37 pressure regulator
38 flow restricting device
39 pressure zone
40 burner orifice
41 electric actuator
42 membrane
43 spring
44 membrane area
45 membrane area

What is claimed is:

1. A servo gas system for a gas burner, namely for controlling a pressure regulation valve positioned in a gas duct of the gas burner, thereby controlling a gas pressure within the gas duct being present downstream of the pressure regulation valve and thereby controlling a pressure difference between a pressure in a burner chamber of the gas burner and the gas pressure within the gas duct, the servo gas system comprising:
   a static servo gas flow branch and a dynamic servo gas flow branch connected in parallel and fluidly extending from the gas duct of the gas burner downstream of the pressure regulation valve, the dynamic servo gas flow branch having a pressure regulator for regulating a pressure in the dynamic servo gas flow branch downstream of the pressure regulator;
   a flow sensing element for sensing a flow between the static servo gas flow branch and the dynamic servo gas flow branch, the flow sensing element in fluid communication with the dynamic servo gas flow branch downstream of the pressure regulator; and
   a controller operatively coupled to the flow sensing element and an electric actuator of the pressure regulation valve of the gas duct, wherein the controller is configured to provide a control signal to the electric actuator for controlling the pressure regulation valve of the gas duct based, at least in part, on the flow sensed by the flow sensing element.

2. The servo gas system of claim 1, wherein the static servo gas flow branch comprises:
   a first flow restricting device;
   a second flow restricting device downstream of the first flow restricting device forming a first pressure zone therebetween, wherein the flow sensing element is in fluid communication with the first pressure zone.

3. The servo gas system of claim 2, wherein the dynamic servo gas flow branch comprises:
   a third flow restricting device downstream of the pressure regulator forming a second pressure zone therebetween, wherein the flow sensing element is in fluid communication with the second pressure zone and measures the flow between the first pressure zone of the static servo gas flow branch and the second pressure zone of the dynamic servo gas flow branch.

4. The servo gas system of claim 3, wherein the pressure regulator of the dynamic servo gas flow branch comprises a pneumatic pressure regulator.

5. The servo gas system of claim 4, wherein the pneumatic pressure regulator is in fluid communication with the pressure in the burner chamber of the gas burner, the gas pressure within the gas duct, and a reference pressure.

6. Servo gas system for a gas burner, namely for controlling a pressure regulation valve positioned in a gas duct of the gas burner, thereby controlling a gas pressure within the gas duct being present downstream of the pressure regulation valve and thereby controlling a pressure difference between a pressure in a burner chamber of the gas burner and said gas pressure within the gas duct, the servo gas system comprising:
   a static servo gas flow branch and a dynamic servo gas flow branch being connected in parallel,
   a flow sensing element being connected between the static servo gas flow branch and the dynamic servo gas flow branch and providing a signal used to control the pressure regulation valve by an electric actuator.

7. The servo gas system of claim 6, wherein the static servo gas flow branch comprises a first flow restricting device and downstream of the first flow restricting device a second flow restricting device thereby providing a first pressure zone upstream of the first flow restricting device in which the gas pressure to be controlled is present, a second pressure zone downstream of the second flow restricting device in which the pressure of the burner chamber is present, and an intermediate pressure zone.

8. The servo gas system of claim 7, wherein the first flow restricting device and the second flow restricting device of the static servo gas flow branch are both fixed flow restricting devices.

9. The servo gas system of claim 7, wherein the first flow restricting device or the second flow restricting device of the static servo gas flow branch is an adjustable flow restricting device, while the other flow restricting device of the static servo gas flow branch is a fixed flow restricting device.

10. The servo gas system of claim 7, wherein the dynamic gas flow branch comprises a pressure regulator and downstream of the pressure regulator a third flow restricting device thereby providing a dynamic gas flow branch first pressure zone upstream of the pressure regulator in which the gas pressure to be controlled is present, a dynamic gas flow branch second pressure zone downstream of the third flow restricting device in which the pressure of the pressure of the burner chamber is present, and a dynamic gas flow branch intermediate pressure zone.

11. The servo gas system of claim 10, wherein the third flow restricting device is a fixed flow restricting device.

12. The servo gas system of claim 10, wherein the third flow restricting device is an adjustable flow restricting device.

13. The servo gas system of claim 10, wherein the first pressure zone of the static servo gas flow branch is connected to the dynamic gas flow branch first pressure zone so that the same pressure is present within the same.

14. The servo gas system of claim 10, wherein the second pressure zone of the static servo gas flow branch is connected to the dynamic gas flow branch second pressure zone so that the same pressure is present within the same.

15. The servo gas system of claim 10, wherein the flow sensing element is connected between the intermediate pressure zone of the static servo gas flow branch and the dynamic gas flow branch intermediate pressure zone of the dynamic servo gas flow branch.

16. The servo gas system of claim 15, wherein another flow restricting device is connected in series to the flow sensing element.

17. The servo gas system of claim 10, wherein the pressure regulator of the dynamic servo gas flow branch is further connected to a reference pressure.

18. The servo gas system of claim 10, wherein another flow restricting device is connected in series to the pressure regulator.

19. A method for controlling a gas pressure in a gas duct of a gas burner via a pressure regulation valve positioned in the gas duct, wherein the gas burner includes a static servo gas flow branch and a dynamic servo gas flow branch situated in a parallel arrangement between the gas duct downstream of the pressure regulation valve and the gas burner, wherein the dynamic servo gas flow branch includes a pneumatic pressure regulator and wherein a flow sensor is connected between the static servo gas flow branch and the dynamic servo gas flow branch downstream of the pneumatic pressure regulator, the method comprising:

receiving a signal from the flow sensor, the signal indicative of a flow between the static servo gas flow branch and the dynamic servo gas flow branch downstream of the pneumatic pressure regulator; and adjusting the pressure regulation valve based on the signal received from the flow sensor.

20. The method of claim 19, wherein the adjusting step includes sending a control signal to an electric actuator that then adjusts the pressure regulation valve based on the signal received from the flow sensor.

* * * * *